United States Patent
Yan et al.

(10) Patent No.: US 12,292,538 B2
(45) Date of Patent: May 6, 2025

(54) METHOD AND SYSTEM FOR POSITIONING AND CORRECTING VISUAL DATA BY SEAFLOOR TOPOGRAPHIC PROFILES

(71) Applicants: The First Institute of Oceanography, MNR, Qingdao (CN); Qingdao National Laboratory of Marine Science and Technology Development Center, Qingdao (CN)

(72) Inventors: Shijuan Yan, Qingdao (CN); Xinyu Shi, Qingdao (CN); Chuanshun Li, Qingdao (CN); Jun Ye, Qingdao (CN); Gang Yang, Qingdao (CN); Zhiwei Zhu, Qingdao (CN); Yue Hao, Qingdao (CN); Dewen Du, Qingdao (CN)

(73) Assignees: The First Institute of Oceanography, MNR, Qingdao (CN); Qingdao National Laboratory of Marine Science and Technology Development Center, Qingdao (CN)

( * ) Notice: Subject to any disclaimer, the term of this patent is extended or adjusted under 35 U.S.C. 154(b) by 268 days.

(21) Appl. No.: 18/088,599

(22) Filed: Dec. 25, 2022

(65) Prior Publication Data
US 2023/0213674 A1    Jul. 6, 2023

(30) Foreign Application Priority Data
Dec. 31, 2021   (CN) .......................... 202111664024.3

(51) Int. Cl.
*G01V 1/38*     (2006.01)
*G06F 18/22*    (2023.01)

(52) U.S. Cl.
CPC .......... *G01V 1/3817* (2013.01); *G01V 1/3808* (2013.01); *G06F 18/22* (2023.01)

(58) Field of Classification Search
CPC .... G01V 1/3817; G01V 1/3808; G01V 1/305; G01V 1/38; G01V 2210/6222;
(Continued)

(56) References Cited

PUBLICATIONS

Martin et al. ("Enabling new techniques in environmental assessment through multi-sensor hydrography," OCEANS 2016 MTS/IEEE Monterey, Monterey, CA, USA, 2016) (Year: 2016).*
(Continued)

*Primary Examiner* — Yuqing Xiao
*Assistant Examiner* — Christopher Richard Walker
(74) *Attorney, Agent, or Firm* — Hemisphere Law, PLLC; Zhigang Ma

(57) ABSTRACT

A method and system for positioning and correcting visual data by seafloor topographic profiles are provided. The method includes: offsetting the water-depth profile of the target survey line equidistantly in a grid layer of a target area to make profiles generated after the offsetting traverse the grid layer of the target area, and obtaining offset data sequences corresponding to the water-depth profile of the target survey line; drawing offset topographic profiles based on offset data of the offset data sequences corresponding to the water-depth profile of the target survey line; calculating a profile similarity between the water-depth profile of the target survey line and each of the offset topographic profiles by using a dynamic time warping (DTW) algorithm; and selecting a geographic location of one of the offset topographic profiles with a largest profile similarity as an actual geographic location of a water-depth profile of a seafloor visual survey line.

1 Claim, 5 Drawing Sheets

(58) Field of Classification Search
CPC ...... G06V 10/12; G06V 10/761; G06V 10/74; G06F 18/22; Y02A 90/30
See application file for complete search history.

(56) References Cited

PUBLICATIONS

Replacement claims (allowed) of CN202111664024.3, Sep. 26, 2024.
CNIPA, Notification to grant patent right for invention in CN202111664024.3, Sep. 30, 2024.

* cited by examiner

METHOD AND SYSTEM FOR POSITIONING AND CORRECTING VISUAL DATA BY SEAFLOOR TOPOGRAPHIC PROFILES

TECHNICAL FIELD

The disclosure relates to the application technology field of seafloor solid mineral resources, in particular to a method and system for positioning and correcting visual data by seafloor topographic profiles.

BACKGROUND

Near seafloor photography is one of the most effective detection methods for investigating seafloor hydrothermal sulfide resources, and the positioning accuracy of near seafloor photography data is the basis for further investigation and research of the sulfide resources. The near seafloor photography data are generally collected by towing a photographical towed body in the near seafloor, and the positioning of a photographic device is generally realized by an ultra-short baseline fixed on a near seafloor device. Measurement accuracy of the ultra-short baseline is high, but due to the measurement environment and other reasons, it will cause false data and error data, or even missing data, which brings difficulties to the positioning of the photographic device.

Some researches have been carried out in China and abroad to eliminate outliers from data of the ultra-short baseline. Li Shoujun et al. (2008) provided a fusion integration method of inertial navigation and ultra-short baseline based on Kalman filtering technology. Zhou Hongwei et al. (2016) developed a software for processing the data of ultra-short baseline based on MATLAB program, the software firstly eliminates positioning jump point data of an acoustic transponder, and then smooths data after eliminating positioning jump point data to obtain a smooth curve. Shan Rui et al. (2019) processed positioning data of the ultra-short baseline based on a robust adaptive Kalman filtering algorithm, filtered out the jump point data in the positioning data, and obtained relatively smooth filtered data that is consistent with original data. MORGADO et al. (2006) provided coupling of the ultra-short baseline and inertial navigation and a data processing method which uses Kalman filter operator. AUGENSTEIN et al. (2008) discussed the causes of abnormal points and data loss of the ultra-short baseline, and provided a method of integrating the global positioning system (GPS), DEL and the ultra-short baseline to use the inertial navigation for processing data. At present, a positioning method of the seafloor photography data is to use ultra-short baseline positioning, but the method currently has following problems.

(1) Due to influences of factors including dynamic changes of the marine environment, the installation and calibration deviation of measuring instruments, the measurement reliability of peripheral equipment, the measurement and correction accuracy of sound velocity, the ultra-short baseline positioning will have large gross errors and continuous abnormal errors.

(2) As an ultra-short baseline positioning system is one of the underwater acoustic positioning technologies, for the underwater acoustic positioning system, the uneven distribution of underwater sound velocity will cause the bending of sound lines, which will seriously affect the positioning accuracy of the system.

(3) The data obtained by the ultra-short baseline positioning system will have a large number of error points and outliers, which will lead to information dislocation of the positioning data in time and space. Even some survey lines cannot find any method to achieve positioning by processing the data of the ultra-short baseline itself, obtained visual data are unable to correspond to actual geographical locations, that is, it is unable to accurately locate the sulfide ore spots obtained through the video, which seriously affects the use and analysis of visual data.

To sum up, the positioning of seafloor visual data which uses ultrashort baselines has problems such as low precision and low accuracy. How to overcome the above problems has become an urgent technical problem in the art.

SUMMARY

A purpose of the disclosure is to provide a method and system for positioning and correcting visual data by seafloor topographic profiles, which aims to improve accuracy and precision of correcting the visual data.

In order to achieve the above purpose, the disclosure provides the method for positioning and correcting visual data by seafloor topographic profiles. The method includes:

step S1: acquiring an original data sequence named a corresponding to a water-depth profile of a target survey line;

step S2: offsetting the water-depth profile of the target survey line equidistantly in a grid layer of a target area to make profiles generated after the offsetting traverse the grid layer of the target area, and obtaining offset data sequences named b corresponding to the water-depth profile of the target survey line;

step S3: drawing offset topographic profiles in batches based on offset data of the offset data sequences named b corresponding to the water-depth profile of the target survey line by taking a distance as a horizontal coordinate and an elevation value as a vertical coordinate; where ones of the offset topographic profiles whose offset distances each are less than a set offset distance are called seafloor topographic profiles;

step S4: calculating, based on the original data sequence named a and the offset data sequences named b corresponding to the water-depth profile of the target survey line, a profile similarity between the water-depth profile of the target survey line and each of the offset topographic profiles by using a dynamic time warping (DTW) algorithm; and step S5: selecting a geographic location of one of the offset topographic profiles with a largest profile similarity as an actual geographic location of a water-depth profile of a seafloor visual survey line.

In an embodiment, the geographic location of the offset topographic profile with the largest profile similarity is used as the actual geographic location of the water-depth profile of the seafloor visual survey line, so that, the sulfide ore spot can be located based on the actual geographic location of the water-depth profile of the seafloor visual survey line.

In an embodiment, the step S4 specifically includes:

step S41: calculating, based on the original data sequence named a and each of the offset data sequences named b corresponding to the water-depth profile of the target survey line, a dynamic time warping value by using the DTW algorithm;

step S42: calculating an original distance between the original data sequence named a and each the offset data sequence named b based on the dynamic time warping value;

step S43: calculating a distance similarity between the original data sequence named a and each the offset data sequence named b based on the original distance between the original data sequence named a and each the offset data sequence named b;

step S44: taking the original distance corresponding to a largest distance similarity as a shortest distance, and taking a path corresponding to the shortest distance as an optimal path;

step S45: calculating a penalty coefficient based on a number of nodes of the optimal path and lengths of diagonal lines during a calculation of the shortest distance; and step S46: calculating the profile similarity between the water-depth profile of the target survey line and each of the offset topographic profiles based on the penalty coefficient and the original distance between the original data sequence named a and each the offset data sequence named b.

In an embodiment, the calculating, based on the original data sequence named a and each of the offset data sequences named b corresponding to the water-depth profile of the target survey line, a dynamic time warping value by using the DTW algorithm by a formula as follows:

$$DTW(a, b) = \begin{cases} 0, m = n = 0 \\ dist(a_1, b_1) + \min \begin{cases} DTW(a, b[2, m]) \\ DTW(a, [2, n], b) \\ DTW(a[2, n], b[2, m]) \end{cases}, \text{others} \\ \infty, m = 0, n = 0 \end{cases}$$

where DTW(a, b) represents the dynamic time warping value, $dist(a_1, b_1)$ represents a first data point in a profile data sequence that is not 0, min represents a function configured to calculate a sum of minimum distances among all other data points except the first data point, m represents a length of the offset data sequence named b, n represents a length of the original data sequence named a, and n and m represent positive integers greater than 2 in the min function.

In an embodiment, the calculating a penalty coefficient based on a number of nodes of the optimal path and lengths of diagonal lines during the calculation of the shortest distance by a formula as follows:

$$\alpha = 1 - \sqrt{\sum_{i=1}^{n} \frac{comLen_i^2}{seqLen^2}}$$

where $comLen_i$ represents a length of a i-th diagonal line, seqLen represents the number of nodes of the optimal path, and α represents the penalty coefficient.

In an embodiment, the calculating the profile similarity between the water-depth profile of the target survey line and each of the offset topographic profiles based on the penalty coefficient and the original distance between the original data sequence named a and each the offset data sequence named b by a formula as follows:

up_distance = distance × α

$$up\_similarity = \frac{1}{1 + up\_distance}$$

where distance represents the original distance between the original data sequence named a and the offset data sequence named b, α represents the penalty coefficient, and up_similarity represents the profile similarity between the water-depth profile of the target survey line and each of the offset topographic profiles.

The disclosure further provides a system for positioning and correcting visual data by seafloor topographic profiles, and the system includes:

an acquiring module, configured to acquire an original data sequence named a corresponding to a water-depth profile of a target survey line.

an offset module, configured to offset the water-depth profile of the target survey line equidistantly in a grid layer of a target area to make profiles generated after the offsetting traverse the grid layer of the target area, and obtain offset data sequences named b corresponding to the water-depth profile of the target survey line;

a drawing module, configured to draw offset topographic profiles in batches based on offset data of the offset data sequences named b corresponding to the water-depth profile of the target survey line by taking a distance as a horizontal coordinate and an elevation value as a vertical coordinate; where ones of the offset topographic profiles whose offset distances each are less than a set offset distance are called seafloor topographic profiles;

a profile similarity calculation module, configured to calculate, based on the original data sequence named a and the offset data sequences named b corresponding to the water-depth profile of the target survey line, a profile similarity between the water-depth profile of the target survey line and each of the offset topographic profiles by using a DTW algorithm; and a correcting module, configured to select a geographic location of one of the offset topographic profiles with a largest profile similarity as an actual geographic location of a water-depth profile of a seafloor visual survey line.

It is worth mentioning that, in some embodiments, the acquiring module is embodied by at least one processor and at least one memory coupled to the at least one processor, and the at least one memory stores programs executable by the at least one processor. Likewise, the offset module is embodied by at least one processor and at least one memory coupled to the at least one processor, and the at least one memory stores programs executable by the at least one processor. Likewise, the drawing module is embodied by at least one processor and at least one memory coupled to the at least one processor, and the at least one memory stores programs executable by the at least one processor. Likewise, the profile similarity calculation module is embodied by at least one processor and at least one memory coupled to the at least one processor, and the at least one memory stores programs executable by the at least one processor. Likewise, the correcting module is embodied by at least one processor and at least one memory coupled to the at least one processor, and the at least one memory stores programs executable by the at least one processor.

In an embodiment, the profile similarity calculation module includes:

a dynamic time warping value calculation unit, configured to calculate, based on the original data sequence named a and each of the offset data sequences named b corresponding to the water-depth profile of the target survey line, a dynamic time warping value by using the DTW algorithm;

an original distance calculation unit, configured to calculate an original distance between the original data sequence named a and each the offset data sequence named b based on the dynamic time warping value;

a distance similarity calculation unit, configured to calculate a distance similarity between the original data sequence named a and each the offset data sequence named b based on the original distance between the original data sequence named a and each the offset data sequence named b;

an optimal path determination unit, configured to take an original distance corresponding to a largest distance similarity as a shortest distance, and take a path corresponding to the shortest distance as an optimal path;

a penalty coefficient calculation unit, configured to calculate a penalty coefficient based on a number of nodes of the optimal path and lengths of diagonal lines during a calculation of the shortest distance; and a profile similarity calculation unit, configured to calculate the profile similarity between the water-depth profile of the target survey line and each of the offset topographic profiles based on the penalty coefficient and the original distance between the original data sequence named a and each the offset data sequence named b.

In an embodiment, the calculating, based on the original data sequence named a and each of the offset data sequences named b corresponding to the water-depth profile of the target survey line, a dynamic time warping value by using the DTW algorithm by a formula as follows:

$$DTW(a, b) = \begin{cases} 0, & m = n = 0 \\ dist(a_1, b_1) + \min \begin{cases} DTW(a, b[2, m]) \\ DTW(a, [2, n], b), \\ DTW(a[2, n], b[2, m]) \end{cases} & \text{others} \\ \infty, & m = 0, n = 0 \end{cases}$$

where DTW(a, b) represents the dynamic time warping value, $dist(a_1, b_1)$ represents a first data point in a profile data sequence that is not 0, min represents a function configured to calculate a sum of minimum distances among all other data points except the first data point, m represents a length of the offset data sequence named b, n represents a length of the original data sequence named a, and n and m represent positive integers greater than 2 in the min function.

In an embodiment, the calculating a penalty coefficient based on a number of nodes of the optimal path and lengths of diagonal lines during the calculation of the shortest distance by a formula as follows:

$$\alpha = 1 - \sqrt{\sum_{i=1}^{n} \frac{comLen_i^2}{seqLen^2}}$$

where $comLen_i$ represents a length of a i-th diagonal line, seqLen represents the number of nodes of the optimal path, and $\alpha$ represents the penalty coefficient.

In an embodiment, the calculating the profile similarity between the water-depth profile of the target survey line and each of the offset topographic profiles based on the penalty coefficient and the original distance between the original data sequence named a and each the offset data sequence named b by a formula as follows:

$$up\_distance = distance \times \alpha$$

$$up\_similarity = \frac{1}{1 + up\_distance}$$

where distance represents the original distance between the original data sequence named a and the offset data sequence named b, $\alpha$ represents the penalty coefficient, and up_similarity represents the profile similarity between the water-depth profile of the target survey line and each of the offset topographic profiles.

Based on specific embodiments provided by the disclosure, the disclosure has technical effects as follows.

The technical solution disclosed by the disclosure does not need to use data obtained by an ultra-short baseline positioning system, only needs to obtain an original data sequence corresponding to a water-depth profile of a target survey line, then offset topographic profiles can be extracted in batches and drawn in a target area at a certain interval. A DTW algorithm is improved, and the improved algorithm is used to calculate a similarity between each of extracted offset topographic profiles and a target profile, Finally, it can match a topographic profile with the highest similarity with the water-depth profile of the target survey line in the target area quickly and accurately, and achieve the purpose of positioning and correcting the seafloor visual data. In addition, the limitation of the original DTW algorithm in the related art is solved in the process of positioning correction.

BRIEF DESCRIPTION OF DRAWINGS

In order to more clearly explain embodiments of the disclosure or the technical solutions in the prior art, the following will briefly introduce the drawings needed in the embodiments. Obviously, the drawings in the following description are only some embodiments of the disclosure. For those ordinary skilled in the art, they can also obtain other drawings based on these drawings without paying creative work.

DETAILED DESCRIPTION OF EMBODIMENTS

In combination with drawings in embodiments of the disclosure, technical solutions in the embodiments of the disclosure will be described clearly and completely. Apparently, the described embodiments are only part of the embodiments of the disclosure, not all of them. Based on the embodiments of the disclosure, all other embodiments obtained by those ordinary skilled in the art without paying creative work should belong to the protection scope of the disclosure.

A purpose of the disclosure is to provide a method and system for positioning and correcting visual data by seafloor topographic profiles, which aims to improve accuracy and precision of correcting the visual data.

In order to make the above purpose, features and advantages of the disclosure more obvious and understandable, the disclosure will be further described in detail in combination with the drawings and specific embodiments.

The research idea is: during an actual operation for investigating seafloor resources, a photographical towed body can obtain high-definition photos of the seafloor, video data and other visual data by a near seafloor towing operation. A conductivity-temperature-depth sensor will be bound to the photographical towed body at the same time, that is, the real-time water-depth data of the photographical towed body can be obtained. In the actual operation, the photographical towed body is required to keep a certain speed and move along a set survey line, so the speed and course of the photographical towed body can be determined, and a track of the photographical towed body is basically similar to a track of the mother ship. Since the track of the mother ship is known, the moving direction and length of the photographical towed body during the operation can be known. In addition, by the conductivity-temperature-depth sensor bound to the photographical towed body, continuous water-depth data during the operation can be obtained, that is, a water-depth profile of a visual survey line of the photographical towed body. Finally, as many topographic profiles as possible are extracted from high-precision topographic data of a target area that corresponds to the moving direction and length of the photographic towed body, and the extracted topographic profiles are matched with the water-depth profile of the visual survey line by a DTW algorithm, then a geographic location of an offset topographic profile having the highest similarity to the water-depth profile when the photographic towed body moves in the target area, and thus the photographic towed body can be positioned and corrected.

Embodiment 1

Figure 1:
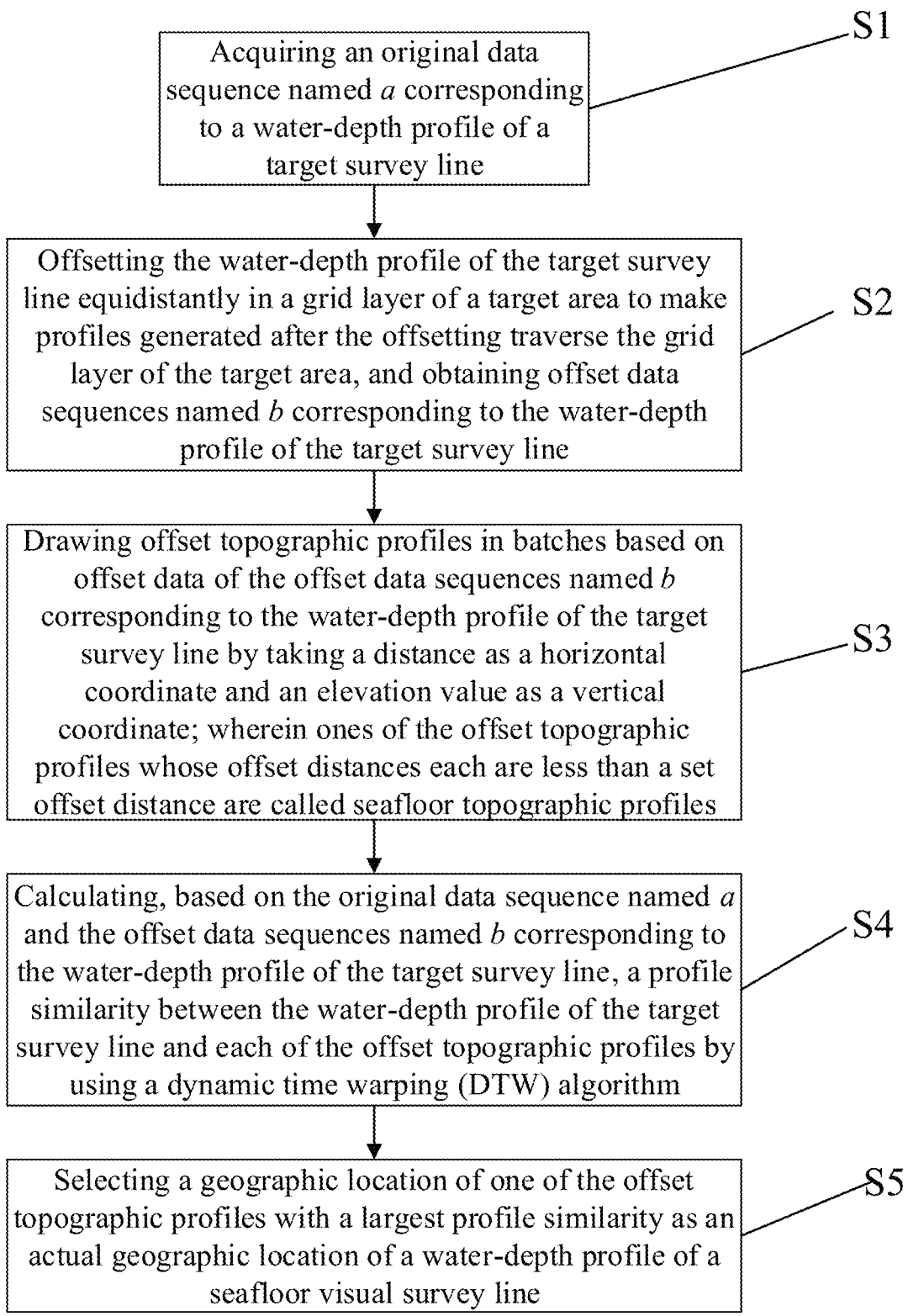
FIG. 1 is a flow chart of a method for positioning and correcting visual data by seafloor topographic profiles of the disclosure.

As shown in FIG. 1, the disclosure discloses a method for positioning and correcting visual data by seafloor topographic profiles, the method includes steps as follows.

Step S1: acquiring an original data sequence named a corresponding to a water-depth profile of a target survey line.

Step S2: offsetting the water-depth profile of the target survey line equidistantly in a grid layer of a target area to make profiles generated after the offsetting traverse the grid layer of the target area, and obtaining offset data sequences named b corresponding to the water-depth profile of the target survey line.

Step S3: drawing offset topographic profiles in batches based on offset data of the offset data sequences named b corresponding to the water-depth profile of the target survey line by taking a distance as a horizontal coordinate and an elevation value as a vertical coordinate; where ones of the offset topographic profiles whose offset distances each are less than a set offset distance are called seafloor topographic profiles.

Step S4: calculating, based on the original data sequence named a and the offset data sequences named b corresponding to the water-depth profile of the target survey line, a profile similarity between the water-depth profile of the target survey line and each of the offset topographic profiles by using a DTW algorithm.

Step S5: selecting a geographic location of one of the offset topographic profiles with a largest profile similarity as an actual geographic location of a water-depth profile of a seafloor visual survey line.

Each of the steps is described in detail below.

The step S1: acquiring an original data sequence named a corresponding to a water-depth profile of a target survey line. $a=(a_1, a_2, \ldots, a_i, \ldots, a_n)$, n represents a length of the sequence and n is a positive integer greater than 2, $a_i$ represents the i-th original data corresponding to the water-depth profile of the target survey line, and the data corresponding to the water-depth profile of the target survey line include the longitude, latitude and elevation information of each grid in the whole target survey line.

In this embodiment, da. UpdateCursor function of ArcPy toolkit is used to read data corresponding to the water-depth profile of the target survey line, thereby defining the original data sequence corresponding to the water-depth profile of the target survey line.

The step 2: offsetting the water-depth profile of the target survey line equidistantly in a grid layer of a target area to make profiles generated after the offsetting traverse the grid layer of the target area, and obtaining offset data sequences named b corresponding to the water-depth profile of the target survey line. At the same time, $b=(b_1, b_2, \ldots b_j, \ldots b_m)$, the in represents a length of the offset data sequence b and the in is a positive integer greater than 2, and the $b_j$ represents the offset data corresponding to the water-depth profile of the target survey line. Each offset data corresponding to the water-depth profile of the target survey line includes FIRST_DIST value and FIRST_Z value. The FIRST_DIST value represents a Euclidean distance from a point of a profile after the offset to a starting point of the profile after the offset, FIRST_Z value represents an elevation value after the offset, the FIRST_Z value is obtained by combining original grid data with a position of the target area of the profile after the offset. The grid layer of the target area is drawn from multiple original grid data of the target area, and the original grid data of the target area include the longitude, latitude and elevation information of each grid in the target area.

In the embodiment, Describe function and Raster function of the ArcPy toolkit are used to obtain length ranges of a water-depth profile of a target survey line to be corrected along the x and y directions and a grid range of the target area. Then, floor function of the math toolkit is used to calculate the maximum number of the offset of the water-depth profile of the target survey line in the target area along the east, west, north and south directions, and perform the offset in batches. Array function of the ArcPy toolkit is used to record all coordinates of the profiles after the offset as a coordinate array, Polyline function of the ArcPy toolkit is used to convert the coordinate array into a Polyline class that can be recognized by the ArcPy toolkit, and finally the loop statement and CopyFeatures_management function of the ArcPy toolkit are used to export grid data (that is, the offset data sequence named b corresponding to the water-depth profile of the target survey line) of the profiles after the offset in batches.

The disclosure performs an offset operation on the water-depth profile of the target survey line by traversing the target area is the first work to perform a matching between the topographic profiles. The smaller interval distances of the profiles after the offset, the more comprehensive the coverage of the target area, and the more accurate the matching result of the topographic profiles. Then, by introducing with new break points along a line, each of the profiles after the offset is densified along an overlapping profile target in a method of capturing profile features. The elevation values and distance values of the profiles and other information related to the profile target inputted by this densification method are stored together in an output table of csv type, these information is used as a data source for drawing a topographic profile map and calculating a photographic profile similarity (also referred to a profile similarity).

The step S3: drawing offset topographic profiles in batches based on offset data of the offset data sequences named b corresponding to the water-depth profile of the target survey line by taking a distance as a horizontal coordinate and an elevation value as a vertical coordinate.

In this embodiment, a loop statement and stackProfile_3d function of the ArcPy toolkit are used to output and store each offset data sequence named b corresponding to the water-depth profile of the target survey line into the output table of the csv type. The read_csv function of the Pandas toolkit is used to read each offset data corresponding to the water depth profile of the target survey line from the output table, and the circular statement and the pylab toolkit are used to draw the offset topographic profiles in batches and store the off topographic profiles in a specified file folder. Multiple offset topographic profiles are called seafloor topographic profiles.

The Step 4: calculating, based on the original data sequence named a and the offset data sequences named b corresponding to the water-depth profile of the target survey line, a profile similarity between the water-depth profile of the target survey line and each of the offset topographic profiles by using a DTW algorithm.

Since each of the topographic profiles is essentially a polyline composed of n point coordinates (FIRST_DIST, FIRST_Z) in a sequence, Python can be used to calculate a similarity between the water-depth profile of the target survey line and each of the offset topographic profiles obtained after the offset. Numpy and math tools are used to firstly calculate a similar distance between them, and then calculate the similarity between them based on the similar distance. The specific calculation process of the disclosure is as follows:

Step S41: calculating, based on the original data sequence named a and each of the offset data sequences named b corresponding to the water-depth profile of the target survey line, a dynamic time warping value by using the DTW algorithm, and where a specific formula applied therefor is as follows:

$$DTW(a,b) = \begin{cases} 0, \ m=n=0 \\ dist(a_1, b_1) + \min \begin{cases} DTW(a, b[2, m]) \\ DTW(a, [2, n], b), \quad \text{others} \\ DTW(a[2, n], b[2, m]) \end{cases} \\ \infty, \ m=0, \ n=0 \end{cases}$$

In the formula, DTW(a, b) represents the dynamic time warping value, dis($a_1$, $b_1$) represents a first data point in a profile data sequence that is not 0, min represents a function configured to calculate a sum of minimum distances among all other data points except the first data point, m represents a length of the offset data sequence named b, n represents a length of the original data sequence named a, and n and m represent positive integers greater than 2 in the min function.

Step S42: calculating an original distance between the original data sequence named a and each the offset data sequence named b based on the dynamic time warping value, where a specific formula applied therefor is as follows:

distance=$DTW(a,b)$

Where, distance represents the original distance between the original data sequence named a and the offset data sequence named b.

Step S43: calculating a distance similarity between the original data sequence named a and each the offset data sequence named b based on the original distance between the original data sequence named a and each the offset data sequence named b, where a specific formula applied therefor is as follows:

$$similarity = \frac{1}{1+distance}$$

Where, similarity represents the distance similarity between the original data sequence named a and the offset data sequence named b Step S44: taking the original distance corresponding to a largest distance similarity as a shortest distance, and taking a path corresponding to the shortest distance as an optimal path.

In a process of similarity matching calculation of topographic profile sequences based on the DTW algorithm of python, some topographic profile sequences have periodic fluctuation characteristics, and monotonic progression rates of their curves are inconsistent. This will lead to that during the calculation of the above algorithm, the path direction can be adjusted to maintain the short-term monotony only by many times, which will lead to a "sick matching" phenomenon of inconsistent peak and trough when calculating the distance between of two topographic profile sequences.

Figure 2:
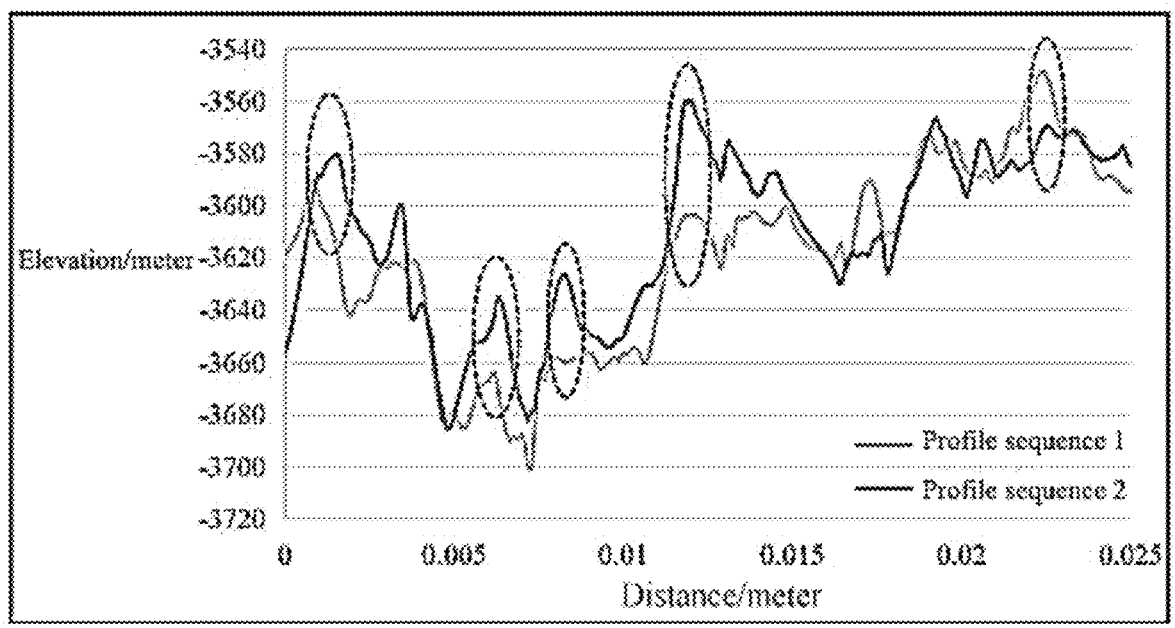
FIG. 2 is a schematic diagram of an abnormal matching of the disclosure.
Figure 3:
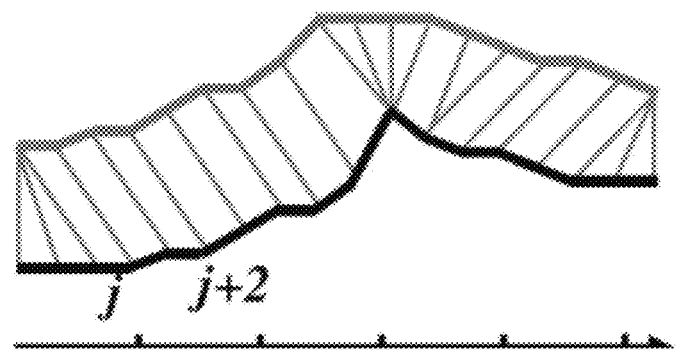
FIG. 3 is a schematic diagram of a matching between two sequences of the disclosure.

Taking FIG. 2 as an example. Since a distance between the two topographic profile sequences at a position indicated by a dotted line is too large, and thus an original distance between the two topographic profile sequences is increased, which will lead to "sick matching" in the matching process. If one of the topographic profile sequences shown as a curve in the FIG. 2 is moved forward or backward appropriately, the regional trend similarity can be satisfied, so as to eliminate the influence of "pathological matching" on similarity. The longer the longest common substring of two sequences is, the smaller the deviation is, and the smaller the adjustment range is. Therefore, the disclosure defines a penalty coefficient α to adjust the original algorithm. The length of each diagonal line is shown as the diagonal line in FIG. 3.

Step S45: calculating a penalty coefficient based on a number of nodes of the optimal path and lengths of diagonal lines during a calculation of the shortest distance, where a specific formula applied therefor is as follows:

$$\alpha = 1 - \sqrt{\sum_{i=1}^{n} \frac{comLen_i^2}{seqLen^2}}$$

Where, $comLen_i$ represents a length of a i-th diagonal line, seqLen represents the number of nodes of the optimal path, and α represents the penalty coefficient.

Step S46: calculating the profile similarity between the water-depth profile of the target survey line and each of the offset topographic profiles based on the penalty coefficient and the original distance between the original data sequence named a and each the offset data sequence named b, where a specific formula applied therefor is as follows:

$$\text{up\_distance} = \text{distance} \times \alpha$$

$$\text{up\_similarity} = \frac{1}{1 + \text{up\_distance}}$$

Where, distance represents the original distance between the original data sequence named a and the offset data sequence named b, $\alpha$ represents the penalty coefficient, and up_similarity represents the profile similarity between the water-depth profile of the target survey line and each of the offset topographic profiles.

The step S5: selecting a geographic location of one of the offset topographic profiles with a largest profile similarity as an actual geographic location of a water-depth profile of a seafloor visual survey line. In this embodiment, the profile similarity between the water-depth profile of the target survey line and each of offset topographic profiles is sorted by python to match the topographic profile with the largest similarity to the water-depth profile of the target survey line in the target area, that is, to achieve the purpose of positioning and correcting the water-depth profile of the seafloor visual survey line.

The similarity calculation and matching between the topographic profile sequences is a key link of the disclosure. The similarity calculation between topographic profile sequences is carried out by selecting the DTW algorithm suitable for the matching of the topographic profiles. In the process of the calculation, the limitations of the original DTW algorithm are found in the related art. The DTW algorithm is improved to solve the problem that "some data sequences of topographic profiles have periodic fluctuation characteristics, and the monotonic progression rates of their curves are inconsistent, which leads to error matching". The disclosure conducts more detailed research on the calculation of similarity between the data sequences, carries out the comprehensive calculation of matching of the topographic profiles in batches based on python, and finally matches the topographic profile with the largest similarity to the water-depth profile of the target survey line in the target area, that is, to achieve the purpose of positioning and correcting the seafloor visual data.

Embodiment 2

Figure 4:
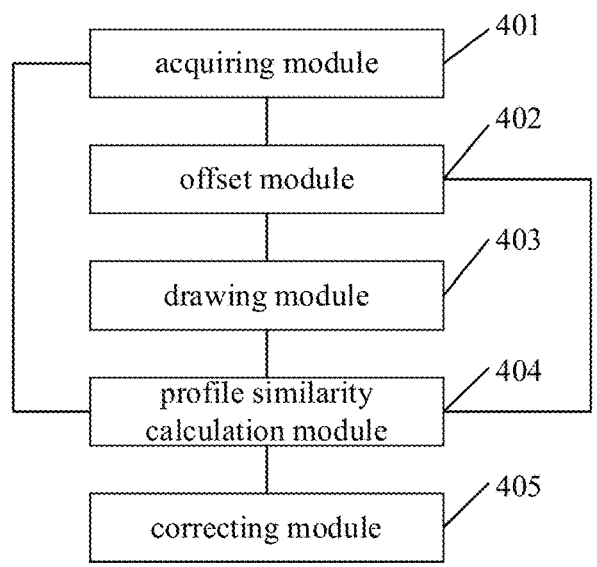
FIG. 4 is a structural diagram of a system for positioning and correcting visual data by seafloor topographic profiles of the disclosure.

As shown in FIG. 4, the disclosure further provides a system for positioning and correcting visual data by seafloor topographic profiles, and the system includes:

an acquiring module 401, configured to acquire an original data sequence named a corresponding to a water-depth profile of a target survey line;

an offset module 402, configured to offset the water-depth profile of the target survey line equidistantly in a grid layer of a target area to make profiles generated after the offsetting traverse the grid layer of the target area, and obtain offset data sequences named b corresponding to the water-depth profile of the target survey line;

a drawing module 403, configured to draw offset topographic profiles in batches based on offset data of the offset data sequences named b corresponding to the water-depth profile of the target survey line by taking a distance as a horizontal coordinate and an elevation value as a vertical coordinate; where ones of the offset topographic profiles whose offset distances each are less than a set offset distance are called seafloor topographic profiles;

a profile similarity calculation module 404, configured to calculate, based on the original data sequence named a and the offset data sequences named b corresponding to the water-depth profile of the target survey line, a profile similarity between the water-depth profile of the target survey line and each of the offset topographic profiles by using a DTW algorithm; and a correcting module 405, configured to select a geographic location of one of the offset topographic profiles with a largest profile similarity as an actual geographic location of a water-depth profile of a seafloor visual survey line.

As an optional embodiment, the profile similarity calculation module 404 of the disclosure specifically includes:

a dynamic time warping value calculation unit, configured to calculate, based on the original data sequence named a and each of the offset data sequences named b corresponding to the water-depth profile of the target survey line, a dynamic time warping value by using the DTW algorithm;

an original distance calculation unit, configured to calculate an original distance between the original data sequence named a and each the offset data sequence named b based on the dynamic time warping value;

a distance similarity calculation unit, configured to calculate a distance similarity between the original data sequence named a and each the offset data sequence named b based on the original distance between the original data sequence named a and each the offset data sequence named b;

an optimal path determination unit, configured to take an original distance corresponding to a largest distance similarity as a shortest distance, and take a path corresponding to the shortest distance as an optimal path;

a penalty coefficient calculation unit, configured to calculate a penalty coefficient based on a number of nodes of the optimal path and lengths of diagonal lines during a calculation of the shortest distance; and a profile similarity calculation unit, configured to calculate the profile similarity between the water-depth profile of the target survey line and each of the offset topographic profiles based on the penalty coefficient and the original distance between the original data sequence named a and each the offset data sequence named b.

The same formulas as in Embodiment 1 will not be repeated here.

Embodiment 3

Figure 5:
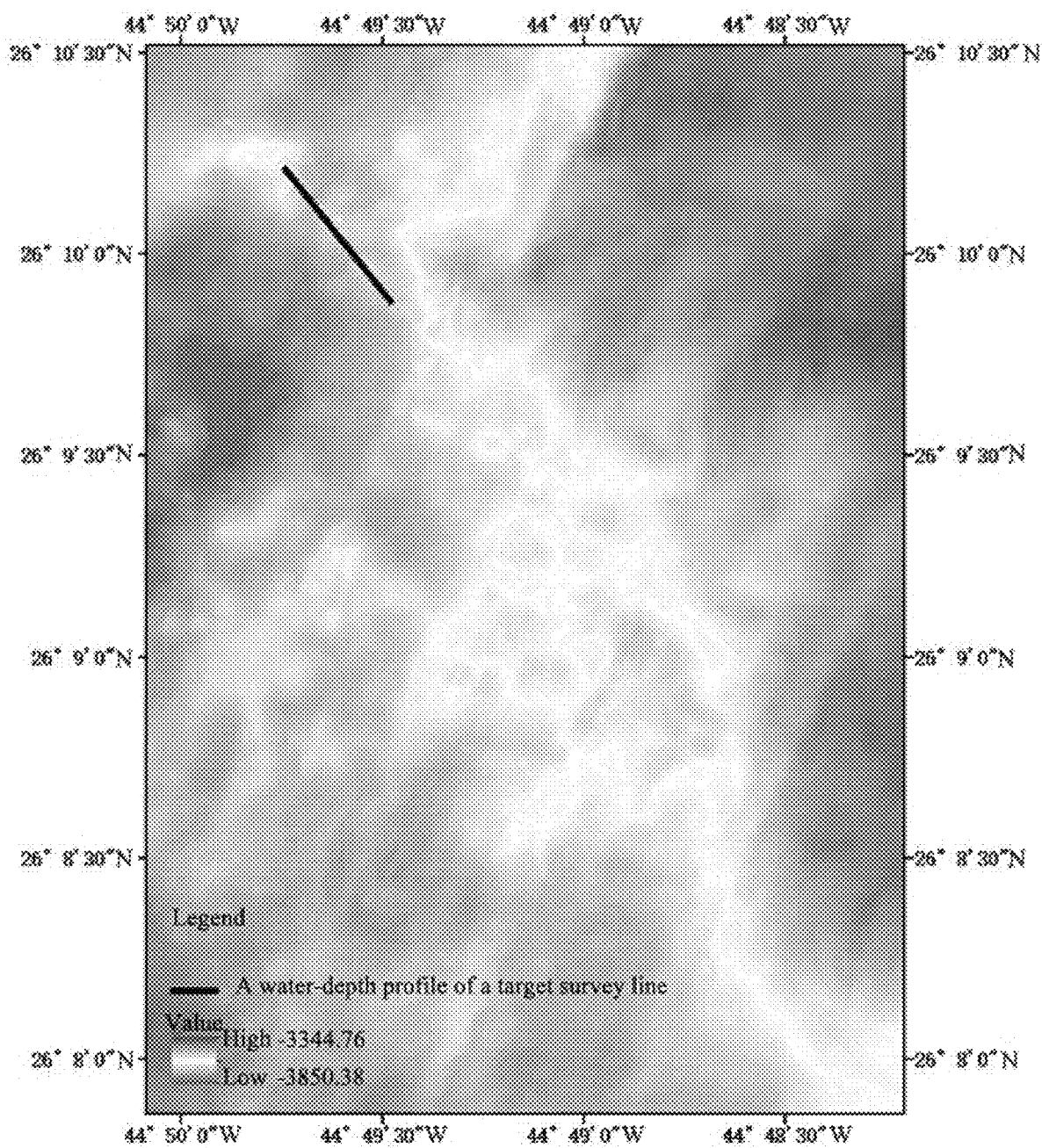
FIG. 5 is a schematic diagram of a target element and a target area of the disclosure.

Before positioning and correcting a seafloor visual profile (also referred to a water-depth profile of a target survey line), the attributes of the original data need be checked firstly. As shown in FIG. 5, the original data tag20marea (high precision topographic data of in the target area AUV) used in this embodiment of the disclosure has following parameters, data accuracy is 1 m×1 m, a data storage format is a GRID format, a data range is from 26.1788306731 to 26.1291175383 along a vertical coordinate, a data range is from −44.83499084 to −44.799911499 along a horizontal coordinate, a spatial reference coordinate system is GCS_WGS_1984, and a datum plane is D_WGS_1984. A target line element named line (that is a water-depth profile of a target survey line) has following parameters, a data range is from 26.170278 to 26.164633 along a vertical coordinate, a data range is from −44.829083 to −44.824617 along a horizontal coordinate, a spatial data type is Shapefile, a geographic coordinate system is GCS_WGS_1984, and a datum plane is D_WGS_1984.

Figure 6:
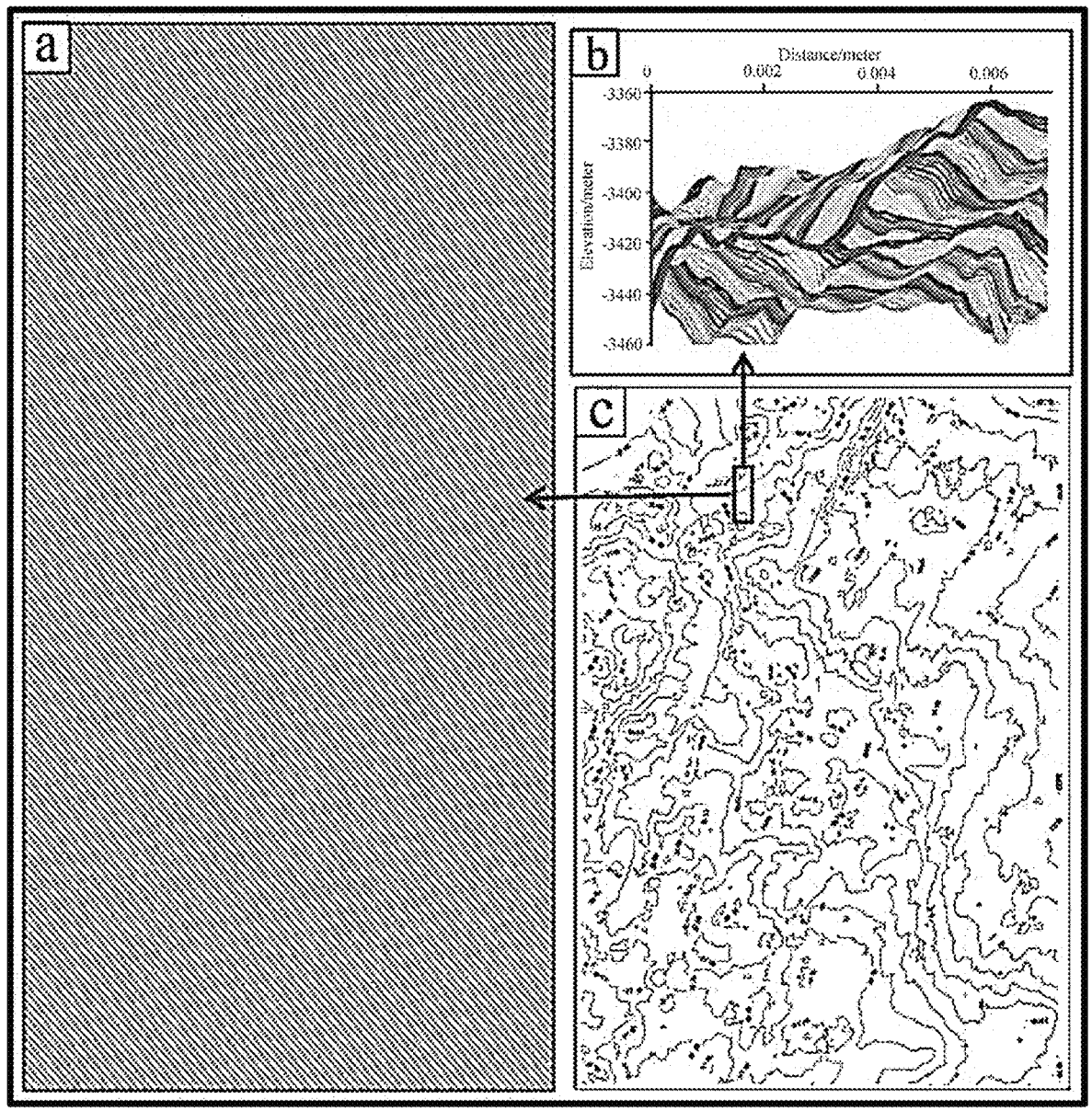
FIG. 6 is a schematic diagram of a topographic profile which traverses the target area.

Step S1: a target line element named line is offset in batches with an average interval of 10 meters in the east, west, north and south directions in the target area named tag20m area. As shown in FIG. 6, the illustration (a) illustrates positions of some of profiles after the offset, the illustration (b) illustrates some of topographic profiles after the offset, and illustration (c) illustrates contour lines of the target area. 186526 offset topographic profiles are obtained after the offset, the offset topographic profiles are named offLines_merge and have following parameters, a spatial data type is Shapefile, a geographic coordinate system is GCS_WGS_1984, and a datum plane is D_WGS_1984.

Step S2: Reading and saving the data of the offset topographic profiles in batches. Since the ArcPy toolkit itself has an upper limit on the amount of the data of the offset topographic profiles that can be read in batches, the step size is set to 10000, that is, the offset topographic profiles are read and saved in batches. After data reading, the data of 186526 the offset topographic profiles are saved to a file named offLines.csv.

Step S3: drawing diagrams of the offset topographic profiles in batches. Reading the data of the topographic profiles saved in the step S2, and drawing the diagrams of the offset topographic profiles in batches. The 186526 diagrams of the topographic profiles are drawn with a name of "profile serial number" respectively and saved as 186256 image files with a format of PNG.

Step S4: calculating a profile similarity between a sequence of the water-depth profile of the target survey line and a sequence of each of the offset topographic profiles by using an optimized DTW algorithm of python. The optimized DTW algorithm is used to calculate the profile similarity between the sequence of the water-depth profile of the target survey line and the sequence of each of the 186526 offset topographic profiles, a similarity calculation result is saved to a file named DTWresult.csv, and TABLE 1 shows details for the result.

TABLE 1

Matching result table of the profile similarity

| up_distance (Similar distance) | up_Similarity (Profile similarity) |
|---|---|
| 'line_96492', 0.139 | 'line_96492', 90.703% |
| 'line_98129', 0.342 | 'line_98129', 74.487% |
| 'line_95946', 0.389 | 'line_95946', 71.990% |
| 'line_98134', 0.396 | 'line_98134', 71.586% |
| 'line_99225', 0.420 | 'line_99225', 70.400% |
| 'line_97582', 0.461 | 'line_97582', 68.414% |
| 'line_98676', 0.465 | 'line_98676', 68.244% |
| 'line_95948', 0.506 | 'line_95948', 66.366% |
| 'line_95947', 0.513 | 'line_95947', 66.078% |
| 'line_98675', 0.553 | 'line_98675', 64.385% |
| 'line_96495', 0.638 | 'line_96495', 61.016% |
| 'line_97588', 0.718 | 'line_97588', 58.193% |
| 'line_99224', 0.761 | 'line_99224', 56.760% |
| 'line_99223', 0.960 | 'line_99223', 50.996% |
| 'line_99222', 1.038 | 'line_99222', 49.043% |
| 'line_95949', 1.107 | 'line_95949', 47.422% |
| 'line_99771', 1.144 | 'line_99771', 46.698% |
| 'line_98128', 1.260 | 'line_98128', 44.239% |
| 'line_96491', 1.290 | 'line_96491', 43.649% |
| 'line_99221', 1.310 | 'line_99221', 43.218% |
| 'line_95402', 1.316 | 'line_95402', 43.168% |
| 'line_97042', 1.352 | 'line_97042', 42.506% |
| 'line_95401', 1.362 | 'line_95401', 42.321% |
| 'line_99770', 1.457 | 'line_99770', 40.696% |
| 'line_98674', 1.473 | 'line_98674', 40.422% |
| 'line_99220', 1.649 | 'line_99220', 37.746% |
| 'line_95403', 1.798 | 'line_95403', 35.731% |
| 'line_99768', 1.817 | 'line_99768', 35.489% |
| 'line_97589', 1.869 | 'line_97589', 34.853% |
| 'line_99767', 1.873 | 'line_99767', 34.798% |
| 'line_96496', 1.957 | 'line_96496', 33.809% |

TABLE 1-continued

Matching result table of the profile similarity

| up_distance (Similar distance) | up_Similarity (Profile similarity) |
|---|---|
| 'line_98135', 2.028 | 'line_98135', 33.024% |
| 'line_99769', 2.059 | 'line_99769', 32.689% |
| 'line_94855', 2.073 | 'line_94855', 32.532% |
| 'line_95950', 2.080 | 'line_95950', 32.460% |
| 'line_97043', 2.237 | 'line_97043', 30.891% |
| 'lline_95945', 2.355 | 'line_95945', 29.804% |
| 'line_99766', 2.372 | 'line_99766', 29.654% |
| 'line_94856', 2.400 | 'line_94856', 29.407% |
| 'line_95404', 2.678 | 'line_95404', 27.184% |
| 'line_96497', 2.806 | 'line_96497', 26.270% |
| 'line_99226', 2.969 | 'line_99226', 25.193% |
| 'line_95951', 3.019 | 'line_95951', 24.877% |
| 'line_99219', 3.120 | 'line_99219', 24.269% |
| 'line_94857', 3.238 | 'line_94857', 23.595% |
| 'line_94309', 3.447 | 'line_94309', 22.485% |
| 'line_94858', 3.876 | 'line_94858', 20.505% |
| . . . | . . . |

Figure 7:
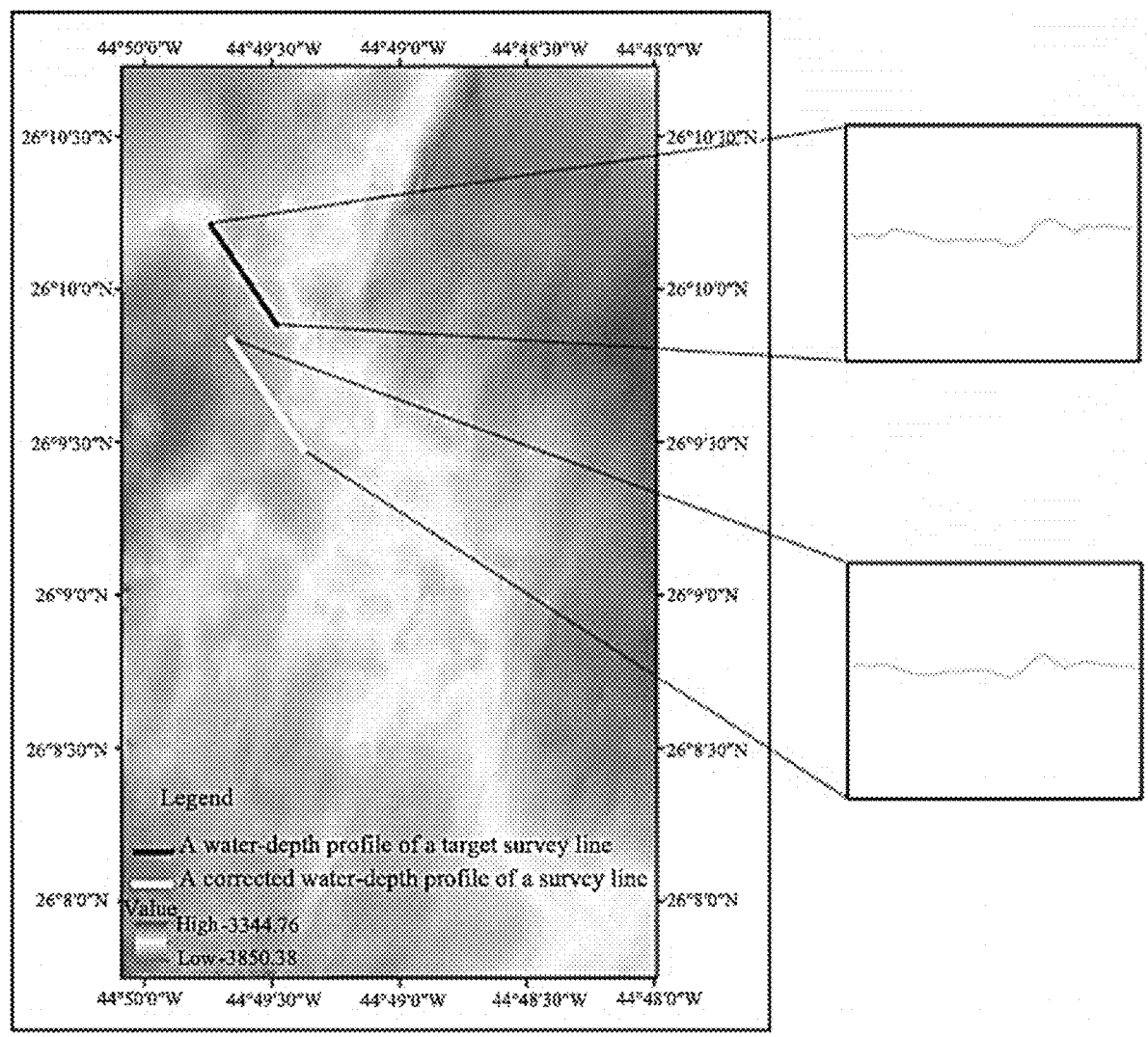
FIG. 7 is a schematic diagram of a comparison among of a target survey line position, a corrected survey line position, and their profiles.

Step S5: each the profile similarity is sorted in descending order, and the result shows: a profile similarity between a sequence of an offset topographic profile where the target line element named line_96492 is located and the sequence of the water-depth profile of the target survey line is 90.703%. By the calculation, the sequence of the offset topographic profile where the target line element named line_96492 is located has a largest profile similarity compared with other sequences of offset topographic profiles in the target area, that is, the actual geographical location of a water-depth topographic profile should be the geographical location where the target line element named line_96492 is located, which realizes the positioning and correcting to the seafloor visual data. FIG. 7 shows a comparison diagram of the position and profile of the target survey line, and the position and profile of the corrected survey line.

In the specification, each of the embodiments is described in a progressive manner. Each of the embodiment focuses on the differences with other embodiments, and the same and similar parts of the embodiments can be referred to each other. For the system disclosed in the embodiments, as it corresponds to the method disclosed in the embodiments, the description is relatively simple. Please refer to the description of the method for details.

In the disclosure, specific examples are used to explain the principle and implementation mode of the disclosure. The above examples are only used to help understand the method and main idea of the disclosure. At the same time, for those skilled in the art, there will be changes in the specific implementation mode and application scope based on the idea of the disclosure. To sum up, the content of the specification should not be interpreted as a limitation on the disclosure.

What is claimed is:

1. A method for positioning and correcting visual data by seafloor topographic profiles, comprising:
   step S1: acquiring an original data sequence named a corresponding to a water-depth profile of a target survey line;
   step S2: offsetting the water-depth profile of the target survey line equidistantly in a grid layer of a target area to make profiles generated after offsetting traverse the grid layer of the target area, and obtaining offset data sequences named b corresponding to the water-depth profile of the target survey line;

step S3: drawing offset topographic profiles in batches based on offset data of the offset data sequences named b corresponding to the water-depth profile of the target survey line by taking a distance as a horizontal coordinate and an elevation value as a vertical coordinate; wherein ones of the offset topographic profiles whose offset distances each are less than a set offset distance are called seafloor topographic profiles;

step S4: calculating, based on the original data sequence named a and the offset data sequences named b corresponding to the water-depth profile of the target survey line, a profile similarity between the water-depth profile of the target survey line and each of the offset topographic profiles by using a dynamic time warping (DTW) algorithm;

wherein the step S4 comprises:

step S41: calculating, based on the original data sequence named a and each of the offset data sequences named b corresponding to the water-depth profile of the target survey line, a dynamic time warping value by using the DTW algorithm, with the formula as follows:

$$DTW(a, b) = \begin{cases} 0, & m = n = 0 \\ dist(a_1, b_1) + \min \begin{cases} DTW(a, b[2, m]) \\ DTW(a, [2, n], b), \\ DTW(a[2, n], b[2, m]) \end{cases} & \text{others} \\ \infty, & m = 0, n = 0 \end{cases}$$

where DTW (a, b) represents the dynamic time warping value, dist $(a_1, b_1)$ represents a first data point in a profile data sequence that is not 0, min represents a function configured to calculate a sum of minimum distances among all other data points except the first data point, m represents a length of the offset data sequence named b, n represents a length of the original data sequence named a, and n and m represent positive integers greater than 2 in the min function;

step S42: calculating an original distance between the original data sequence named a and each of the offset data sequences named b based on the dynamic time warping value;

step S43: calculating a distance similarity between the original data sequence named a and each of the offset data sequences named b based on the original distance between the original data sequence named a and each of the offset data sequences named b;

step S44: taking the original distance corresponding to a largest distance similarity as a shortest distance, and taking a path corresponding to the shortest distance as an optimal path;

step S45: calculating a penalty coefficient based on a number of nodes of the optimal path and lengths of diagonal lines during a calculation of the shortest distance, with the formula as follows:

$$\alpha = 1 - \sqrt{\sum_{i=1}^{n} \frac{comLen_i^2}{seqLen^2}}$$

where $comLen_i$ represents a length of an i-th diagonal line, seqLen represents the number of nodes of the optimal path, and $\alpha$ represents the penalty coefficient;

step S46: calculating the profile similarity between the water-depth profile of the target survey line and each of the offset topographic profiles based on the penalty coefficient and the original distance between the original data sequence named a and each of the offset data sequences named b, with the formula as follows:

$$up\_distance = distance \times \alpha$$

$$up\_similarity = \frac{1}{1 + up\_distance}$$

where distance represents the original distance between the original data sequence named a and the offset data sequence named b, $\alpha$ represents the penalty coefficient, and up_similarity represents the profile similarity between the water-depth profile of the target survey line and each of the offset topographic profiles; and step S5: selecting a geographic location of one of the offset topographic profiles with a largest profile similarity as an actual geographic location of a water-depth profile of a seafloor visual survey line.

\* \* \* \* \*